United States Patent [19]

James

[11] 4,196,856
[45] Apr. 8, 1980

[54] VARIABLE GEOMETRY CONVERGENT DIVERGENT EXHAUST NOZZLE

[75] Inventor: Varnell L. James, Kent, Wash.

[73] Assignee: The Boeing Company, Seattle, Wash.

[21] Appl. No.: 854,766

[22] Filed: Nov. 25, 1977

[51] Int. Cl.$^2$ ............................................. B64C 15/06
[52] U.S. Cl. ................................. 239/265.39; 60/228
[58] Field of Search .................................. 60/228–230, 60/232, 265, 271; 244/53 R; 239/265.25, 265.27, 265.29, 265.33, 265.37, 265.39, 265.41

[56] References Cited

U.S. PATENT DOCUMENTS

| | | | |
|---|---|---|---|
| 2,780,056 | 2/1957 | Colley | 239/265.41 |
| 2,972,226 | 2/1961 | Geary | 239/265.39 |
| 2,989,845 | 6/1961 | Howald | 239/265.39 |
| 3,352,494 | 11/1967 | Colville et al. | 239/265.33 X |

*Primary Examiner*—Robert B. Reeves
*Assistant Examiner*—Andres Kashnikow
*Attorney, Agent, or Firm*—Christensen, O'Connor, Johnson & Kindness

[57] ABSTRACT

A variable geometry gas turbine engine exhaust nozzle is disclosed wherein the inner surface of the nozzle housing and the surface of the tail plug are defined by two sets of hinged together axially extending elements and the nozzle housing outer surface is defined by a single set of axially extending elements. Viewed in the transverse direction, the elements are of an annular geometry with adjacent elements circumferentially overlapping one another to define an annular exhaust duct. A set of hydraulically operated drive units, connected for radial displacement of the juncture between the two sets of elements that define the nozzle housing inner surface, provides rapid control over the nozzle throat diameter. A set of gear driven drive units controls axial displacement of the forward end of the elements defining the nozzle housing outer surface and drives hinged together annular extending support beams into abutment with the overlapping regions of the nozzle housing inner wall. The geometry of the tail plug, which is formed by two hinged together sets of axially extending elements, is controlled by a set of screw driven drive units.

13 Claims, 18 Drawing Figures

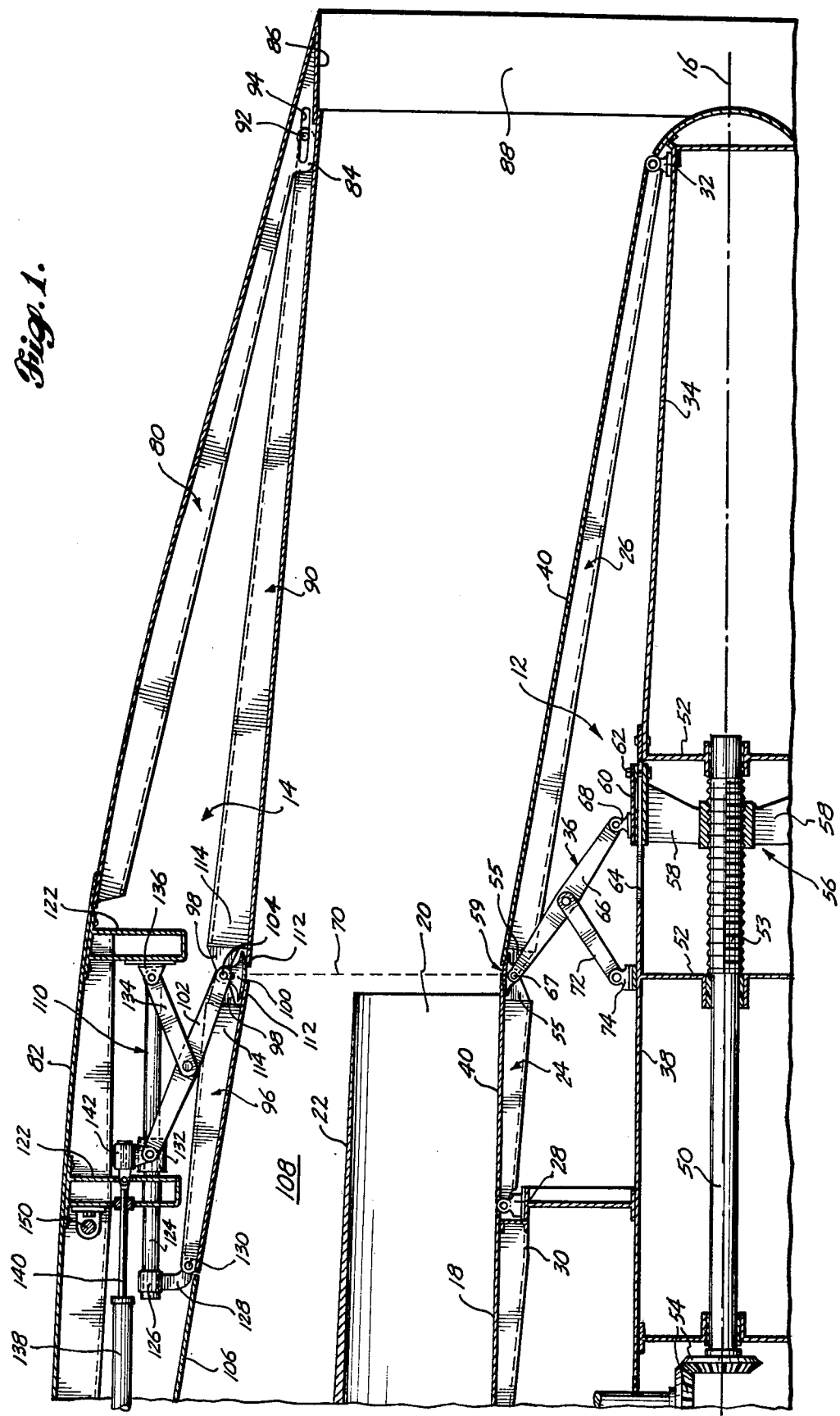

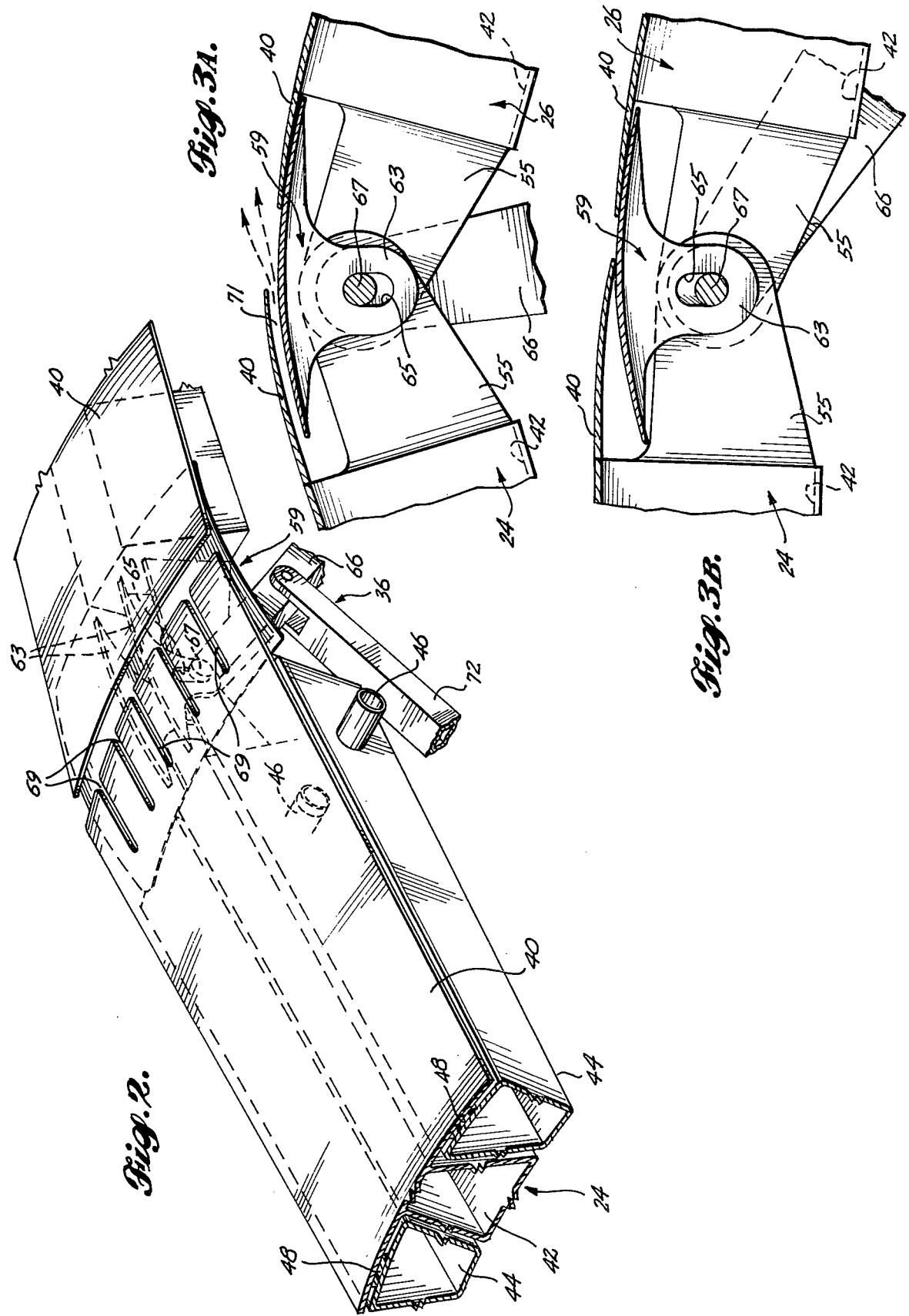

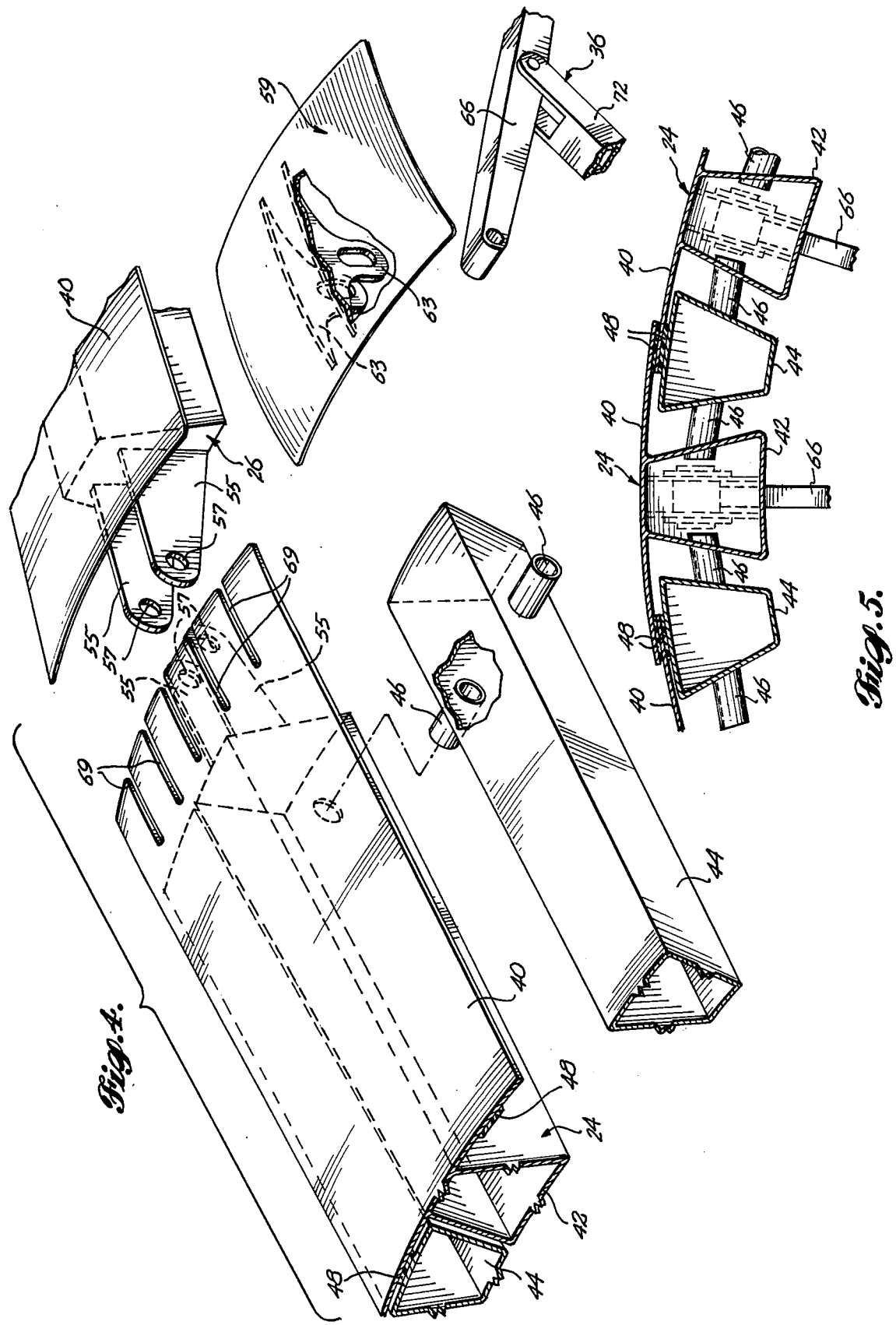

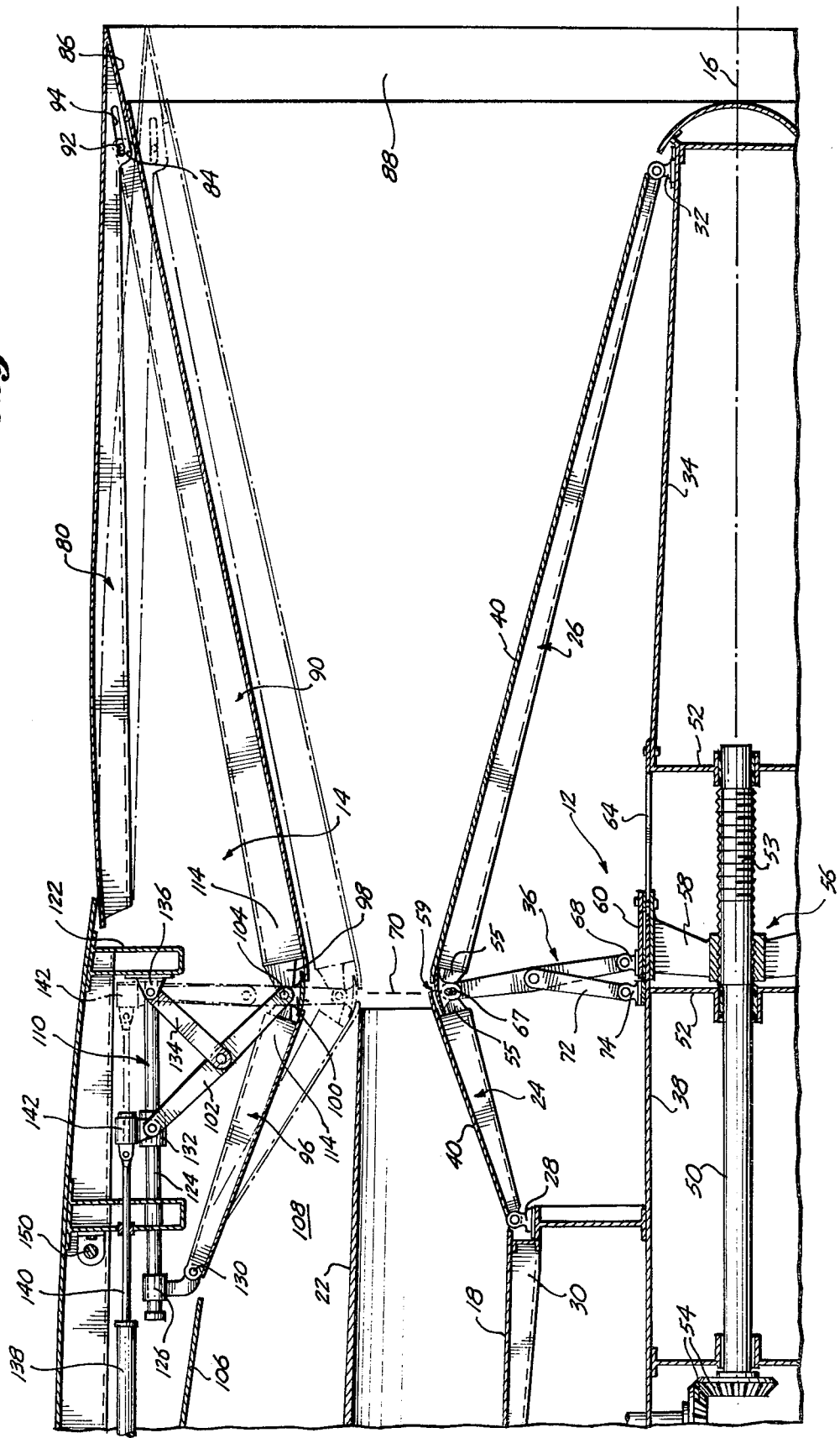

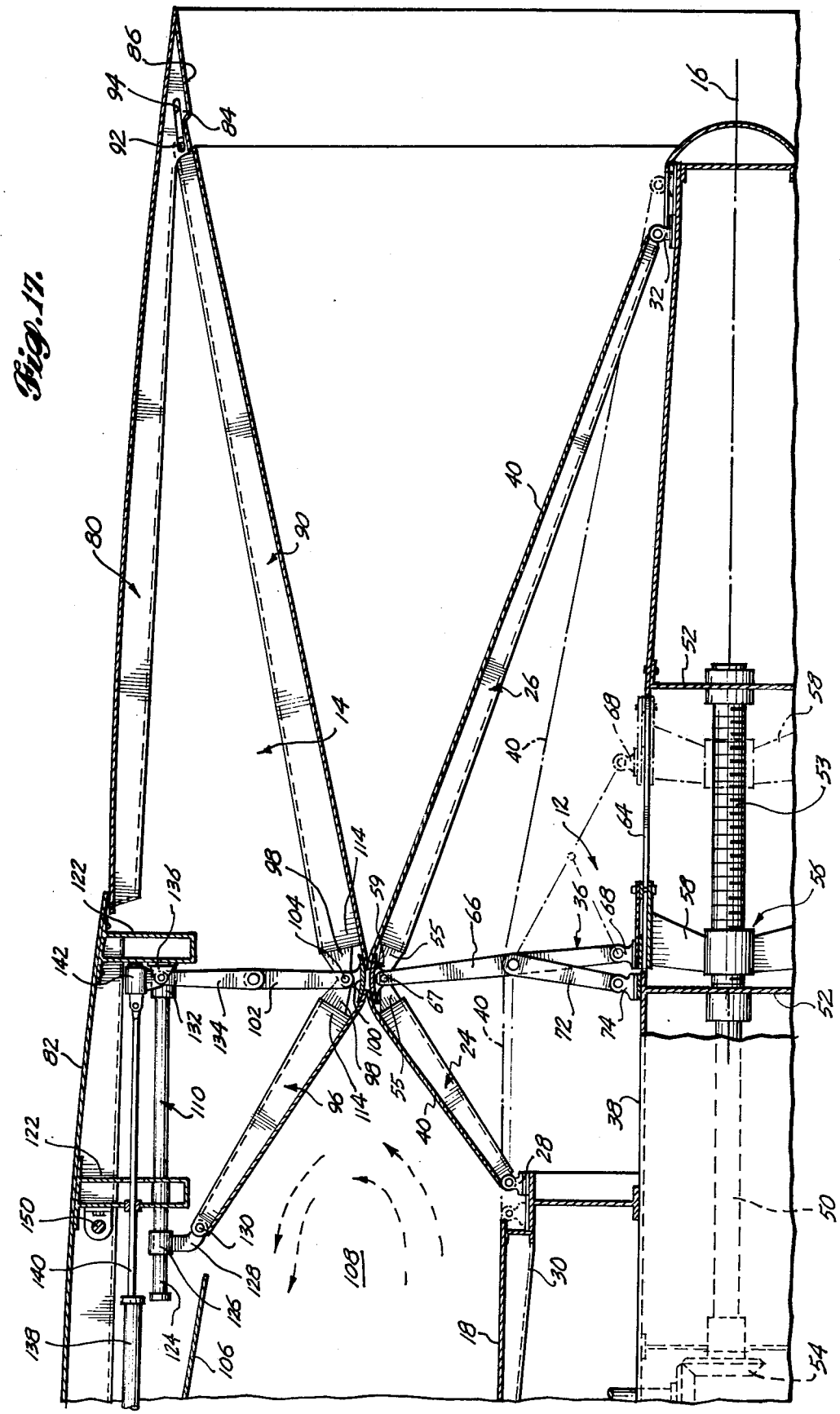

VARIABLE GEOMETRY CONVERGENT DIVERGENT EXHAUST NOZZLE

BACKGROUND OF THE INVENTION

This invention relates to exhaust nozzles for directing gas turbine exhaust gas into the atmosphere to propel an airplane or other vehicle. More particularly, this invention relates to a variable geometry convergent-divergent exhaust nozzle configured for providing optimum thrust over a wide range of flight conditions including operation of an aircraft at subsonic and supersonic speeds.

It is known that maximum thrust and operating efficiency of a gas turbine engine that supplies propulsive thrust is obtained when the engine exhaust effluent is directed through an exhaust nozzle which controls the expansion of the exhaust gases since controlled expansion of the high temperature, high pressure gases supplied by the gas turbine engine increases the particle velocity of the exhaust effluent and hence increases the momentum of the thrust exhaust producing stream. In this respect, maximum operating efficiency is generally achieved when the nozzle is configured to exit the exhaust stream at substantially the same pressure as that of the surrounding ambient atmosphere.

When an aircraft operates both at subsonic and at supersonic speeds, the exhaust nozzle pressure ratio, i.e., the ratio of the total fluid pressure upstream of the nozzle to the ambient atmospheric pressure, varies over a substantial range. In particular, under subsonic flight conditions the nozzle pressure ratio is relatively small and a nozzle having a convergent shape provides the desired expansion characteristics. On the other hand, under supersonic flight conditions, the nozzle pressure ratio is quite high and proper expansion of the exhaust effluent is effected by an exhaust nozzle having a convergent portion followed by a divergent portion, which type of exhaust nozzle is generally referred to as a convergent-divergent exhaust nozzle. Moreover, fairly substantial variations in pressure ratio results from various engine throttle settings and, in some cases, also results from "ram effect" when an increased amount of air is effectively forced through the engine as the aircraft moves through the atmosphere at high speed. Because of these factors a fixed geometry exhaust nozzle is often not satisfactory. Accordingly many attempts have been made to design variable geometry exhaust nozzles which are operable to exit the engine exhaust into the ambient atmosphere at approximately the same pressure as that of the atmosphere during all flight regimes.

In general, such prior art attempts have included variable geometry plugs which extend rearwardly relative to the flow of exhaust gases and which are supported within an outer housing or duct of fixed geometry; a variable geometry outer housing which may or may not include a rearwardly extending central plug of fixed geometry; and, the combination of a variable geometry outer housing and a variable geometry plug. Since the variable geometry exhaust nozzles include means for varying both the geometry of the outer duct and the geometry of the plug permit control over the area of an annular throat region which is formed between the maximum diameter region of the plug and the minimum diameter region of the outer housing and permit control over the nozzle exit area, the latter type of variable geometry nozzles is generally more desirable than types in which only the outer housing or only the plug geometry can be controlled.

Although a variety of exhaust nozzles in which both the plug and outer housing are of variable geometry have been proposed, such prior art nozzles have not simultaneously met all of the necessary design criteria. For example, to minimize drag, such an exhaust nozzle must be containable within the conventional housing arrangement of a gas turbine engine installation and, to effect overall cost efficiency in an aircraft, must be of acceptable weight. Further, to provide reliable operation and economy of fabrication, such an exhaust nozzle and the associated operating mechanism must not be unduly complex.

Beyond failing to adequately comply with the basic requirements, the prior art variable geometry exhaust nozzles exhibit other drawbacks and disadvantages. First, these devices generally have not been configured for operating in conjunction with thrust reverser apparatus that is conventionally employed in a thrust producing gas turbine engine installation. Thus, additional apparatus must often be included to control the engine exhaust gases during thrust reversal operation, thereby generally increasing the weight, cost and complexity of the overall engine installation. Further, because of the relatively high pressure, high velocity flow within the exhaust nozzle, the apparatus which operates the variable outer housing of the exhaust nozzle is subjected to substantial forces that are exerted in the outward radial direction. To withstand these forces and thereby provide proper pressure containment, the prior art operating apparatus has generally been heavy and relatively slow in operating speed. Such limitations in operating speed do not permit rapid and precise changes in exhaust nozzle geometry that can be desirable under certain engine operating conditions. In particular, relatively rapid changes in pressure of either a cyclic or sporadic nature can occur under supersonic and transonic flight conditions. Since such pressure changes not only cause at least a temporary decrease in operating efficiency, but can cause pressure disturbances within the engine that result in damage to the engine, it is highly desirable to rapidly effect an appropriate decrease in nozzle throat area as such pressure changes occur. Prior art variable geometry exhaust nozzles have not been constructed in a manner which permits rapid and precise modulation of the nozzle throat area under such conditions.

Accordingly it is an object of this invention to provide a variable geometry exhaust nozzle configured for use in a gas turbine engine installation, such exhaust nozzle being operable between a convergent configuration and a convergent-divergent configuration.

It is another object of this invention to provide a gas turbine engine exhaust nozzle of the above described type wherein the geometry of both the exhaust nozzle outer housing and the geometry of the rearwardly extending tail plug can be continuously varied, either independently or simultaneously to provide a wide range of nozzle throat areas and exhaust nozzle exit areas.

It is still another object of this invention to provide a variable geometry exhaust nozzle of the above described type wherein the nozzle throat area can be precisely and rapidly controlled in response to rapid changes in exhaust nozzle pressure ratio while simultaneously providing an exhaust nozzle structured for containing the relatively high pressure engine exhaust effluent.

It is yet another object of this invention to provide an exhaust nozzle of the above described type that is relatively light in weight, containable within a region of relatively low volume, and of relatively low structural complexity.

SUMMARY OF THE INVENTION

These and other objects are achieved in accordance with this invention by an exhaust nozzle wherein the inner and outer surfaces of a nozzle housing and the surface of a rearwardly extending tail plug are comprised of longitudinally extending members that are denoted herein as petals. Each petal comprises a surface sheet that is arcuate in cross-sectional geometry and tapered along the longitudinal direction. A beam member, which is of generally trapezoidal cross-sectional geometry and is tapered along the longitudinal direction, is joined to the interior surface of each surface sheet and extends longitudinally along the central portion thereof.

In accordance with the invention, the petals are arranged in circumferentially extending sets that define axially extending regions of the tail plug and axially extending regions of the inner and outer surfaces of the nozzle housing. More specifically, the axially extending surface sheets of adjacent petals within each set of petals circumferentially overlap with one another with the upstream and downstream ends of each petal beam being mounted for pivotable movement such that the petals can be radially displaced relative to the axial centerline of the exhaust nozzle. Since each set of petals defines an axial region of the plug and the nozzle housing, such radial displacement controls the geometry of an exhaust passage that is formed between the inner surface of the nozzle housing and the outer surface of the tail plug. As each set of petals is displaced, the overlapping regions of adjacent petals slide across one another such that the surface region formed by each set of petals remains continuous and aerodynamically smooth.

In the disclosed embodiments, the variable geometry plug of the exhaust nozzle of this invention includes a support tube that is concentrically mounted about the exhaust nozzle axial centerline and extends axially from the aft portion of the gas turbine engine, e.g., the aft turbine stage. The forward end of a first set of petals is pivotably mounted at the aft termination of the inner wall of the gas turbine engine primary flow duct such that the first set of petals effectively forms a continuation of the inner flow boundary of the primary flow duct. A second set of petals is hinged to the aft or downstream end of the first set of petals and extends to a mounting ring which is slidably contained along the downstream portion of the support tube. In this arrangement, the aft end of each petal beam of the first set of petals is pivotably attached to the forward end of an associated petal on the second set of petals. Drive linkage extends radially between the exterior of the support tube and the junctures between associated petals of the first and second set of petals, which junctures collectively define the maximum plug diameter. A driven threaded shaft, which passes axially along the interior of the support tube, activates the drive linkage to radially displace the hinged together ends of the first and second set of petals as the threaded shaft is rotated. When the drive linkage moves the juncture between the two sets of petals radially inward and outward, the mounting ring which supports the aft end of the second set of petals slides along the support tube and the maximum diameter of the plug is decreased or increased.

To maintain a continuous boundary surface at the juncture of the two sets of petals, the preferred embodiments of the invention include arcuately shaped elements that are mounted at the juncture of the petals and the drive linkage. When viewed transverse to the direction of flow, the arcuate elements overlap with one another to form a continuous circular assemblage or ring which varies in diameter as the diameter of the plug is varied. In the axial direction, each surface sheet of the first and second set of petals extend over the outer surface of the circular assemblage of arcuate elements. Further, in the preferred embodiment, the outer surface of the arcuate elements and the regions of the surface sheets that overlap the circular assemblage of arcuate elements are contoured such that both sets of petals substantially contact and seal with the arcuate elements when the plug is operated to less than its maximum diameter position. When the plug is at or near the maximum diameter position, the surface sheets of the first or forwardmost set of petals do not contact the surface of the circular assemblage of arcuate elements but are spaced outwardly therefrom. Air, supplied, for example, from the gas turbine engine bleed air supply, flows outwardly from the interior of the tail plug and along the exterior surface of the tail plug. Since this air flows in the same direction as the turbine exhaust gases, the air establishes a boundary layer which maintains flow attachment and prevents separation and turbulence that might otherwise result when the plug is extended to, or near, its maximum diameter position.

The outer surface of the nozzle housing is formed by a set of circumferentially overlapping petals that extend axially from the aft termination of the engine housing or nacelle with the aft termination of the petals forming a generally circular exit opening. The forward end of this set of petals is not directly attached to the nacelle but is linked to mechanically operated drive units and is driven in the fore and aft direction to vary the area of the exhaust nozzle exit opening.

The interior geometry of the nozzle housing, i.e., the inner surface of the nozzle housing, is configured similarly to the surface of the variable plug and comprises two serially arranged sets of petals wherein each set of petals defines an axially extending region of the nozzle housing wall. As in the plug arrangement, the beam member of each petal of an upstream or forward set of petals is pivotally attached to a beam member of an associated petal in a downstream or aft set of petals and drive linkage, which controls the radial displacement of the juncture between the sets of petals, is connected to each petal juncture. Preferably, the juncture between the two sets of petals includes a circular assemblage of arcuate elements which is similar to the circular assemblage of arcuate elements utilized in the tail plug. As in the variable geometry tail plug, this assemblage of arcuate elements is effectively a variable diameter ring which spans the gap between the first and second set of petals to effectively provide a continuous air flow boundary. The aft end of each petal of the downstream set of petals is linked to the aft terminus of the petals which form the exterior surface of the exhaust nozzle housing. In particular, each beam of the aft set of petals includes pins that extend transversally from each side of the beam with each pin passing into an axially extending slot that is located in flanges which project radially inward from the petals that form the exterior surface of the exhaust nozzle housing.

The forward end of the upstream set of petals is positioned to extend rearwardly from and effectively form a continuation of the outer boundary wall of the gas turbine engine fan duct or secondary flow duct. The forward end of each of these petals is not physically interconnected with the boundary wall of the fan duct, but instead the beam member of each petal is linked to an associated hydraulically operated drive mechanism which controls the geometry of the nozzle housing. In particular, each petal beam of the upstream set of petals is pivotably attached to a collar which slides on an axially extending shaft that is mounted in a fixed orientation within the interior region of the engine nacelle. A second collar is slidably mounted to the axially extending shaft at a position aft of each collar that interconnects with the forward end of the upstream set of petals. This second collar is pivotably interconnected with one of the previously mentioned drive links that extend to the juncture between each petal of the upstream set of petals and the associated petal in the downstream set of petals. Additionally, each of the second collars is attached to an axially extending hydraulic actuator which drives the second collar fore and aft along the axially extending shaft. As the collar is moved along the shaft, the juncture between the first and second set of petals is driven in the radial direction to control the exhaust nozzle throat area, i.e., the area of the annular region formed between the maximum diameter region of the plug and the minimum diameter region of the nozzle housing.

Each set of petals that forms a boundary surface of the exhaust nozzle housing is also driven and supported by a set of axially extending support beams that are positioned along the interior surface of the overlap region formed between adjacent petals. These support beams have a substantially trapezoidal cross-sectional geometry and, since the support beams extend along the regions of overlap, the support beams are circumferentially interspersed with the beams which are attached to the nozzle housing surface sheets, i.e., the petal beams. The forward end of each support beam that extends along an overlap region between the petals which form the exterior surface of the nozzle housing is pivotably attached to a threaded collar that is engaged with an axially extending threaded rod. Each axially extending threaded rod is mounted within the interior region of the engine housing or nacelle between adjacent ones or previously described hydraulically operated drive units and is gear driven by a conventional rotary drive unit.

The two sets of support beams that are positioned along the overlap regions of those petals which form the inner surface of the nozzle housing are pivotably joined together at a position which corresponds to the juncture between the petal beams, i.e., the exhaust nozzle throat region. Additionally, the forward end of the upstream support beams are each pivotably attached to collars that are threadedly engaged with an associated one of the above described threaded rods and a third threaded collar is engaged with the central region of each of the axially extending threaded rods. The third collar is pivotably interconnected with the juncture between the two support beams that extend along an overlap region between petals that form the interior boundary surface of the nozzle housing by means of rigid drive links.

As the threaded rods are rotated, the threaded collars travel axially along the threaded rods with the centermost collar driving the juncture between the serially arranged support beams in the radial direction to support the overlapping petals and thereby ensure adequate pressure containment. Further, the aftmost threaded collar drives the support beams which extend along the overlap region of these petals which form the exterior surface of the nozzle house in the fore and aft direction. Since the aft end of each of these support beams is interconnected with the aft regions of the petals that form the exhaust nozzle exit opening, this axial movement in conjunction with the attendant radial positioning of the juncture between the serially connected support beams, establishes the effective diameter or area of the exhaust nozzle exit opening.

The operation of the exhaust nozzle of this invention to achieve the previously defined objectives can be understood by recognizing that the mechanically driven drive units (threaded rods) and the hydraulically operated drive units are simultaneously operated to drive the petals of the nozzle housing and the associated support beams to the desired configuration. Thus, during periods in which relatively rapid changes in the geometry of the nozzle housing are not necessary, the support beams usually remain in contact with the overlapping region of the petals as the geometry of the nozzle housing is varied. For example, during subsonic flight conditions when the exhaust nozzle is in a convergent configuration, the nozzle pressure ratio is generally of a value of two or less and rapid variations in nozzle pressure ratio do not generally occur. Thus, rapid changes in exhaust nozzle configuration are not required. On the other hand, and as previously described, supersonic flight conditions often require both precise and rapid control over the nozzle geometry, and in particular a rapid and precise decrease in the nozzle throat area. Under such conditions, the hydraulically actuated drive mechanism provides the necessary rapid control by radially displacing the junction between the two sets of petals that form the inner boundary wall of the nozzle housing. Since the aft ends of these serially arranged sets of petals are linked to the aft end of the petals that form the outer boundary of the exhaust nozzle by means of the previously described pin and slot arrangement, and since the collar which links the forward end of the two sets of serially arranged petals is free to slide along the shafts of the hydraulically operated drive units, the system presents little inertia to such rapid decreases in the nozzle throat area. Further, since the pin and slot arrangement allows the aft end of the petals to move fore and aft, such rapid changes in nozzle throat area are effected with little or no change in the area of the nozzle exit opening.

Thus, during rapid contraction of the nozzle throat region the petals effectively move away from the associated support beams to rapidly modulate the nozzle throat area. Since, as previously mentioned, the hydraulically operated drive units and the mechanically operated drive units are simultaneously operated, the support beams will automatically move into contact with the overlap regions of the petals should the nozzle pressure ratio remain at the value which caused the rapid contraction to occur.

BRIEF DESCRIPTION OF THE DRAWING

Other objects and advantages of the present invention will be apparent to one skilled in the art after reading the following description taken together with the accompanying drawings in which:

FIG. 1 is a partial cross-sectional view along the axial center line of a gas turbine engine equipped with a embodiment of the invention wherein the exhaust nozzle of this invention is illustrated in the subsonic operating mode;

FIG. 2 is a partially cut away perspective view of a portion of variable geometry plug of this invention;

FIGS. 3a and 3b are cross-sectional views depicting the maximum diameter region or throat region of the variable geometry plug of FIGS. 1 and 2 with FIG. 3a illustrating the plug in the supersonic operating mode and FIG. 3b illustrating the plug in the subsonic operating mode;

FIG. 4 is an exploded perspective view which further illustrates the construction of a variable geometry plug configured in accordance with this invention;

FIG. 5 is a partial cross-sectional view taken transverse to the axial center line of the exhaust nozzle of FIG. 1 which further illustrates the variable geometry plug of this invention;

FIG. 16 is a partial cross-sectional view taken along the axial center line of the exhaust nozzle which illustrates the embodiment of the invention depicted in FIG. 1 operating in the supersonic cruise mode and in a thrust reversal mode; and FIG. 17 is a partial cross-sectional view taken along the axial center line of a gas turbine installation which dpicts an embodiment of this invention that is arranged for operation with yet another type of gas turbine engine.

DETAILED DESCRIPTION

Figure 7:
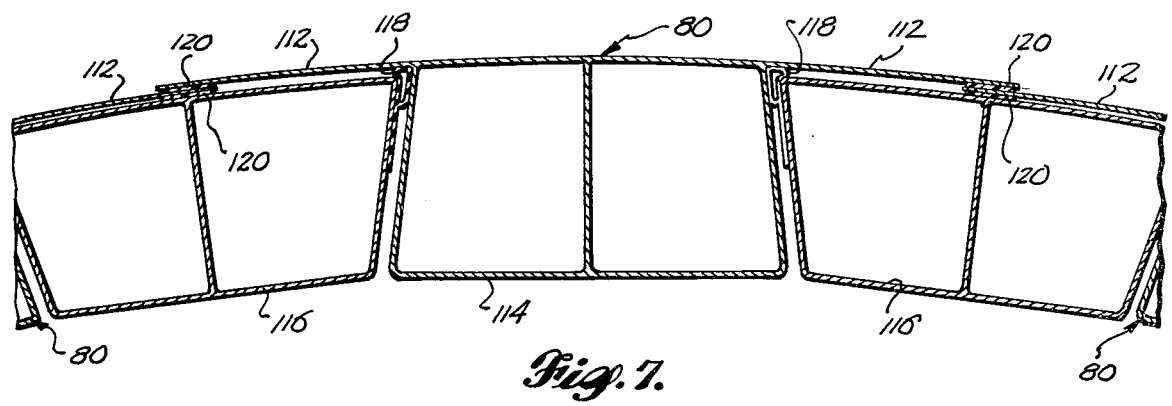
FIGS. 7 and 8 are partial cross-sectional views taken transverse to the axial center line of the exhaust nozzle of FIG. 1 which respectively depict the detailed structure of the outer and inner boundary surfaces of the exhaust nozzle housing.

FIG. 1 depicts the aft portion of one type of gas turbine engine equipped with a variable geometry exhaust nozzle constructed in accordance with this invention. As illustratd in FIG. 1, the variable geometry exhaust nozzle of this invention basically comprises a variable geometry plug assembly and a variable geometry nozzle housing assembly 14.

The plug assembly 12 extends rearwardly from the aft termination of the gas turbine engine being concentrically mounted about the axial center line 16 of the gas turbine engine installation. In particular, the outer surface of the plug assembly 12 effectively forms a continuation of an inner boundary wall 18 of the gas turbine engine primary flow duct 20, which primary flow duct 20 is defined between the inner boundary wall 18 and a substantially cylindrical outer boundary wall 22 that concentrically surrounds the inner boundary wall 18. As is known in the art, combustion products developed in the gas turbine engine combustor stages (not shown) and exiting the engine turbine stages (not shown) flow through the primary flow duct 20 for expansion within the nozzle assembly and subsequent discharge into the atmosphere.

The outer surface of the plug assembly 12 is formed by two sets of axially extending elements which are denoted herein as "petals." As is illustrated in FIG. 1, a set of upstream petals 24 form the forward boundary surface of the variable geometry plug 12 and a set of downstream petals 26 form the aft portion of the boundary surface of the plug 12. In this arrangement, the forward end of each upstream petal 24 is pivotably attached to a ring 28 that surrounds a cylindrical shell 30 which is concentrically contained within the primary flow duct inner boundary wall 18 and projects rearwardly therefrom. In a similar manner, the downstream or aft end of each downstream petal 26 is connected to a ring 32 which concentrically surrounds the aft end of a conical extension 34 which is concentrically mounted about the axial center line 16. Each upstream plug petal 24 is pivotably attached to an associated downstream plug petal 26 at the juncture between the upstream and downstream set of plug petals and a drive assembly, generally denoted by the numeral 36, extends radially between the hinged together juncture of end petal 24 and 26 and a cylindrical tube 38 that extends axially rearward from the center of the gas turbine engine installation.

As is best illustrated in FIGS. 2-5, each petal 24 and 26 of the plug assembly 12 includes a longitudinally extending surface sheet 40 having an arcuate cross-sectional geometry. Each surface sheet 40 is tapered in the longitudinal direction with each surface sheet 40 exhibiting maximum dimension at the juncture between the petals 24 and 26. A beam 42 having a trapezoidal cross-sectional geometry is either attached to or formed integrally with the surface sheets 40 and extends axially along the central region of the interface of the surface sheets 40.

Support beams 44 extend longitudinally along each petal beam 42 with one face of each support beam 44 being substantially parallel to the inner surface of the surface sheets 40. As is illustrated in FIG. 5, the support beams 44 are thus circumferentially interspersed with the petal beams 42 with the fore and aft ends of each support beam 44 being linked to the adjacent petal beam 42 by means of pins 46 that extend outwardly from the support beams 44 and pass into suitably sized openings in the walls of the petal beams 42. As is further illustrated by FIG. 5, the edge regions of adjacent ones of the surface sheets 40 overlap with one another with the circumferentially spaced apart support beams 44 being positioned beneath each of the overlap regions. Additionally, wiper strips 48 extend between the overlap region of the surface sheets 40 to permit the surface sheets 40 to slide across one another and the surface of the support beam 44 as the plug geometry is varied. Each wiper strip 48 is formed from a material suitable for operation in a relatively high temperature environment. Such materials include for example, various wire mesh materials that are impregnated with compounds containing carbon.

Referring again to FIG. 1, the geometry of the plug 12 is controlled by a shaft 50 that is mounted within the central tube 38 and extends along the axial center line 16. The shaft 50 is supported in a series of journals 52 that extend radially across the interior of the central tube 38 and is driven by a set of bevel gears 54 that are located at the upstream end of the shaft 50. As the shaft 50 is rotated, a threaded nut assembly 56 is caused to travel fore and aft along a threaded portion 53 of the shaft 50. The nut assembly 56 includes a plurality of arms 58 which extend radially outward to the interior surface of the central tube 38. A sleeve 60, which encircles the tube 38, is interconnected with each of the radially extending arms 58 by means of bolts 62 which pass through axially extending slots 64 in the wall of the central tube 38. An elongate expander link 66 of each drive assembly 36 extends radially between an annular mounting ring 68, which is affixed to the outer periphery of the sleeve 60, and the juncture between the plug petals 24 and 26. Each drive assembly 36 also includes an elongate link 72 which is pivotably attached to the central region of the expander link 60 and pivotally attached to a mounting ring 74 that is affixed to the exterior surface of the central tube 38 at a position forward of the sleeve 60. Thus, as the shaft 50 is rotated to drive the threaded nut assembly 56 in the fore and aft direction, the outer ends of the expander links 36 move radially inward and outward to control the geometry of the plug assembly 12. As can be seen by comparing FIGS. 1 and 16, such movement of the threaded nut assembly 56 causes the plug assembly 12 to assume a maximum diameter region at a transverse plane which corresponds to the throat region of the depicted exhaust nozzle (identified by the numeral 70).

Referring again to FIGS. 2-5, the beams 42 of each hinged-together petal 24 and 26 include a pair of axially entending spaced apart flanges 55. The flanges 55 of the petals 24 and 26 being dimensioned for nested assemblage with one another with openings 57, which are located in each of the flanges 55, being in alignment with one another when the petals 24 are assembled to the petals 26. To bridge the gap between each petal 24 and 26 and thereby provide a substantially continuous flow boundary, an arcuate element 59 is interconnected with the flanges 55 at each juncture between a petal 24 and 26. As is best illustrated in the exploded view of FIG. 4, each element 59 exhibits an arcuate cross-sectional geometry in both the axial and transverse directions and includes a pair of spaced apart flanges 63 that extend downwardly from the lower surface thereof. As is illustrated in FIGS. 2 and 3, when the petals 24 are assembled to the petals 26, the flanges 63 of the elements 59 extend downwardly along the outer surfaces of the petal flanges 55. A pin 67 extends through elongate slots 65 in the flanges 63 of the elements 59, through the openings 57 of the petal flanges 55 and through a suitable sized opening in the end of the drive unit expander rod 66 to thereby pivotably join together a petal 24, a petal 26, one of the elements 59, and an associated expander link 66. Since the elements 59 extend circumferentially about the plug 12 and are of a dimension commensurate with the circumferential dimension of each petal 24 and 26, the elements 59 overlap one another and effectively form a continuous ring which varies in diameter as the drive units 36 control the diameter of the plug 12.

As is shown in FIGS. 2 and 4, the aft edge of each surface sheet 40 of the petals 24 include a series of substantially parallel spaced apart slots 69. These slots cause the surface sheet 40 of the petals 24 to conform to the geometry of the assemblage of elements 59 whenever the drive units 36 cause the petals 24 to be drawn tightly against the surface of the elements 59. In particular, and with reference to FIGS. 3a and 3b, it can be seen that the orientation between the surface sheet 40 of the petals 24 and the outer surface of the elements 59 varies as the maximum diameter of the plug 12 is increased and decreased. In this respect, in FIG. 3a, which illustrates the plug 12 deployed to a supersonic position wherein the nozzle arrangement of the invention forms a convergent divergent nozzle, the pin 67 is forced against the upper termination of the slots 65 and the flanges 63 of the arcuate elements 59. Under these conditions, the outer surface of the element 59 is in abutment with the surface sheets 40 of the downstream petals 26, whereas the surface sheets 40 of the upstream petals 24 are spaced apart from the surface elements 59. Thus, an annular channel 71 is formed between the surface of the elements 59 and the surface sheets 40 of the petals 24. Air, supplied for example from the gas turbine bleed system, exits the interior of the plug 12 through the annular channel 71 and passes rearwardly along the upper surface of the elements 59 and the surface sheets 24 of the petals 26. This air energizes the surface of the plug 12 to thereby prevent flow detachment and separation which could otherwise occur when the plug 12 is deployed to such a bulbous position. On the other hand, as is illustrated in FIG. 3b, when the plug 12 is deployed to a minimum diameter position, i.e., the subsonic mode of operation depicted in FIG. 1, the pins 67 are forced against the inwardly located termination of these slots 65 and the surface sheets 40 of the upstream petals 24 and downstream petals 26 are pressed tightly against the surface of the elements 59 to effectively form a continuous flow boundary.

Both the inner and outer boundary surfaces of the nozzle housing assembly 14 are formed by circumferentially interspersed petals and support beams similar to the petals 24 and 26 and the support beams 44 utilized in the variable geometry plug 12. In particular, and with reference to FIG. 1, the aft portion of the exterior surface of the exhaust nozzle housing 14 is formed by a set of petals 80 which extend longitudinally from the aft termination of the exterior boundary surface 82 of the gas turbine outer housing or nacelle. The forward boundary edge of each petal 80 is not directly linked to the boundary surface 82, but, as shall be described hereinafter, is supported through circumferentially adjacent support members which extend axially along the region of overlap between adjacent petals 80.

The aft termination of each petal 80 includes a pair of downwardly extending flanges 84 and an arcuately contoured inner surface region 86 which in conjunction with such regions of the other petals 80 forms a cylindrical nozzle exit opening 88. The flanges 84 are spaced apart from one another for receiving the beam members of a set of petals 90 which form a downstream or aft portion of the interior surface of the exhaust nozzle housing 14. Each petal 90 is joined to an associated petal 80 by pins 92 which extend outwardly from the beam member of the petals 90 into axially extending slots 94 which are located in each of the flanges 84 of the petals 80. The forward end of each petal 90 is hinged to an associated petal 96 at a point corresponding to the throat region 70 of the exhaust nozzle. More specifically, the petals 90 and 96 are joined together in a manner analogous to that described with respect to the petals 24 and 26 of the plug assembly 12. Thus, each petal 90 and petal 96 includes axially extending flanges 98 which nest with one another to form a hinge joint. Like the previously described junctures between the petals 24 and 26 and plug assemby 12, each juncture between a petal 90 and 96 of the outer housing 14 includes an arcuate ring element 100 and an expander link 102, with the petal flanges 98, ring element 100 and expander link 102 being pivotably attached to one another by a pin 104 which passes through suitably sized openings in each of the components. As described relative to the ring element 59, the elements 100 exhibit an arcuate contour in both the transverse and axial directions and, with respect to the transverse direction, are tapered such that adjacent ring elements 100 overlap one another and form a substantially continuous ring which varies in diameter as the geometry of the nozzle housing 14 is controlled. Like the ring elements 59 of the plug assembly 12, the ring elements 100 of the nozzle housing assembly 14 bridge the gap between the petals 90 and 96 such that a substantially continuous flow surface is maintained as the geometry of the nozzle housing 14 is varied.

The forward end of each petal 96 is positioned adjacent to and aft of the substantially circular boundary wall 106 of an annular airflow duct 108 that is formed between the boundary wall 106 and the exterior surface of the outer boundary wall 22 of the primary flow duct 20. As is known in the art, secondary air flow is supplied through the annular duct 108 by the gas turbine engine fan stages or other conventional sources which are not shown in FIG. 1. As shall be described in more detail hereinafter, the forward edge of the petals 96 are not connected to the duct boundary 106, but are linked to hydraulically operated drive assemblies 110 which, in conjunction with gear driven drive assemblies 144 to be described relative to FIG. 14, control the geometry of the nozzle housing 14.

Figure 6:
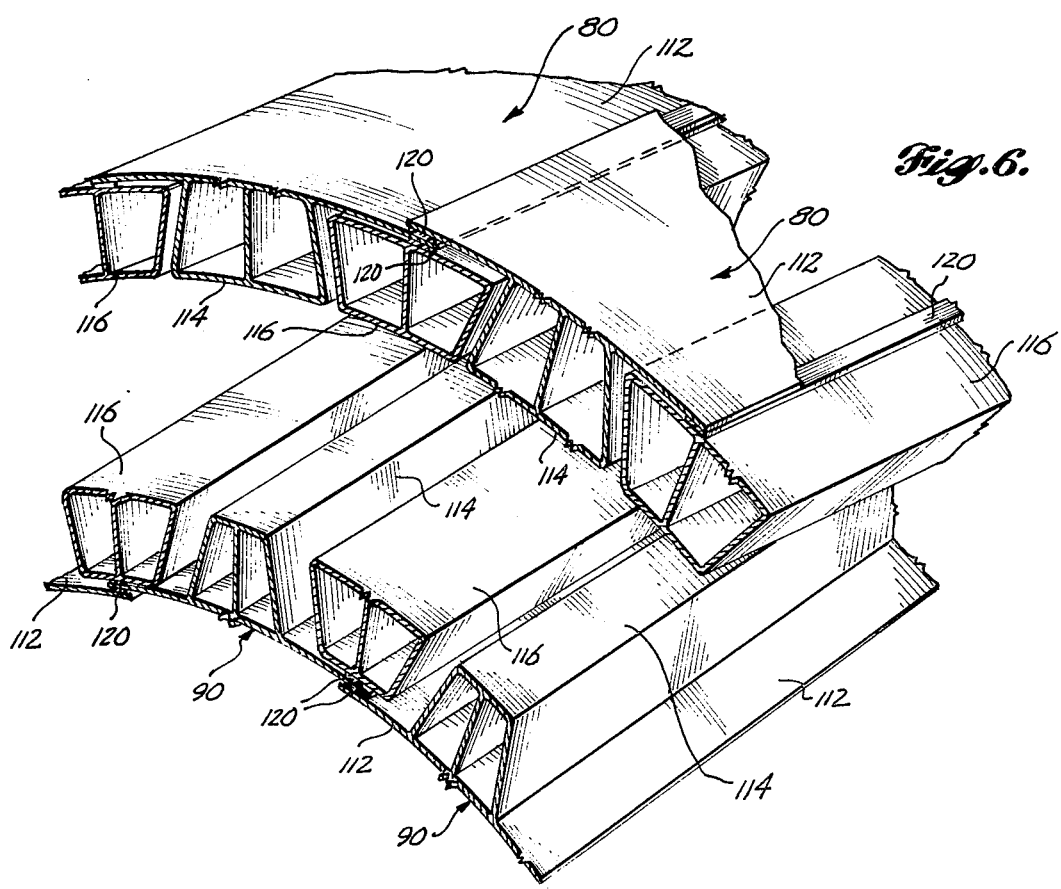
FIG. 6 is a partially cutaway perspective view which depicts the variable geometry nozzle housing of this invention.
Figure 8:
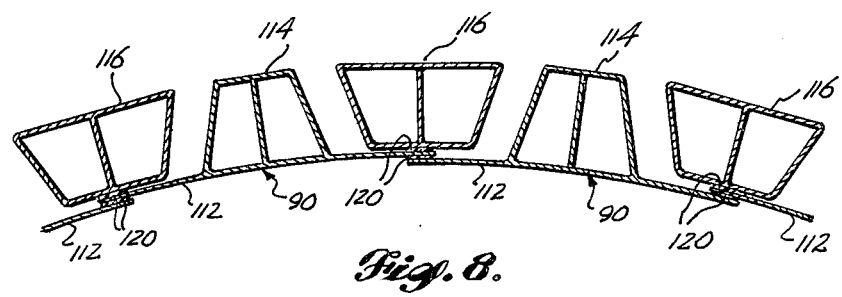

The construction and arrangement of the petals 80, 90 and 96 of the nozzle housing 14 is further depicted in FIGS. 6 through 8. As is illustrated in the partial perspective view of FIG. 6, each of the petals 80 and 90 include longitudinally extending surface sheets 112 and a beam member 114 that is either formed integrally with the surface sheets 112 or is conventionally attached thereto to extend longitudinally along the central interior region of each surface sheet 112. As can be seen in FIGS. 6 through 8, longitudinally extending support beams 116 are circumferentially interspersed between each of the petal beams 114 of the petals 80, 90 and 96. Each of the support beams 116 is of trapezoidal cross-sectional geometry and is arranged relative to the petal beams 114 such that, when the exhaust nozzle house assembly 14 is in a minimum diameter configuration, the circumferentially interspersed beams 114 and 116 effectively form a continuous annular pattern. For example, FIG. 7 illustrates a single petal 80 and two circumferentially adjacent support beams 116 with the exhaust nozzle housing 14 being positioned to define the minimum circumference of the outer surface of the exhaust nozzle. As can be seen in FIG. 7, when the nozzle is so positioned, the beam members 114 and 116 are positioned substantially adjacent to one another and a pliant seal 118 prevents fluid pressure from escaping from the interior of the nozzle housing 14 into the atmosphere. In particular, each pliant seal 118 is constructed from a material such as neoprene or thin metal and is attached to the sidewall of the beams 116. Since the fluid pressure within the interior of the housing is generally greater than the atmospheric pressure, each seal 118 is forced into the opening between the outer surface of the support beams 116 and the adjacent inner surface of the surface sheet 112. As is further illustrated by FIGS. 6 through 8, the overlap regions of the surface sheets 112 include axially extending wiper strips 120 mounted between adjacent surface sheets 112 and the support beams 116. Like the wiper strips 48 utilized in the variable geometry plug 112, the wiper strips 120 permit the surface sheets 112 to slide across one another and slide across the surface of the support beams 116 as the geometry of the nozzle housing 14 is varied.

Each of the support beams 116 that are circumferentially interspersed with the beams 114 of the petals 80 are joined to the adjacent petal beams 114 in the manner described relative to the petal beam assembly of the variable geometry plug 12. More specifically, pins, such as the pins 46 of FIG. 2, extend outwardly from each of the radially spaced apart boundary walls of the support beams 114 at a position near the nozzle exit opening 88 and at a position near the forward terminus of the support beams 116. Each of the pins extend into suitably sized openings in the adjoining boundary wall of the petal beams 114 to cause the support beams 116 and petal beams 114 of the petals 80 to move in unison with one another as the geometry of the nozzle housing is varied. The aft end of the support beams 116 and petal beams 114 of the petals 90 are linked together in a similar fashion. However, the forward end of the support beams 116 and petal beams 114 of the petals 90 are not linked together in this manner but are arranged such that the serially connected petals 90 and 96 can be moved independently of the circumferentially interspersed support beams 116. In this respect, the hydraulically operated drive unit 110 control displacement of the petals 90 and 96 and the gear driven drive units 144 of FIG. 14 control displacement of the associated support beams 116.

More specifically and referring again to FIG. 1, each of the hydraulically operated drive units 110 are mounted to a pair of axially spaced apart channels 122 which extend radially into the interior region of the exhaust nozzle housing 14 from the outer boundary wall 82 of the engine housing or nacelle. Each of the hydraulically operated drive units 110 include a shaft 124 which extends forwardly from the rearmost channel 122 and extends through the forwardmost channel 122. A collar 126 slidably surrounds the portion of the shaft 124 that is located forward of the forwardmost channel 122. Each collar 126 includes a tabular arm 128 that extends radially inward. The inward end of each arm 128 is pivotably attached to the forward end of an associated petal beam 114 of the upstream petals 96 by a pin 130 that passes through suitably sized openings in the walls of the petal beams 114 and the arm 128. A second collar 132 is slidably contained on the shaft 134 in the region between the two channels 122. Each collar 132 is pivotably interconnected with one end of an associated expander arm 102 which extends inwardly and rearwardly to the previously described hinged connection between the petals 90 and 96. An elongate link 134 extends between the central region of the expander arm 102 and a mounting bracket 136 which secures the shaft 110 to the rearwardmost channel 122. The ends of the link 134 are pivotally attached to the expander link 102 and the mounting bracket 136 with the link 132 and expander arm 102 being dimensioned and arranged such that as the collar 132 is moved fore and aft along the shaft 110, the hinged together juncture between the petals 90 and 96 travel inwardly and outwardly in a plane that is substantially transverse to the exhaust nozzle to thereby form and control the geometry of the exhaust nozzle throat region 70. Fore and aft movement of each collar 132 is effected by means of a conventional hydraulic cylinder 138 having an axially extending actuator rod 140 that is pivotably attached to the collar 132 and expands arm 102 by a mounting bracket 142.

Figure 14:
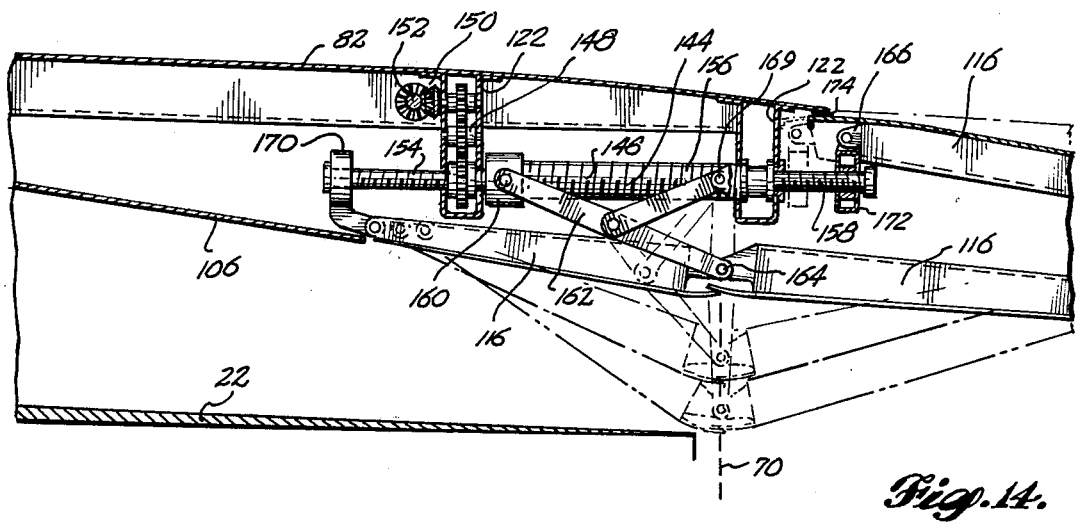
FIG. 14 is a partial cross-sectional view taken along the axial direction which further illustrates one of the two types of drive mechanisms depicted in FIGS. 9 through 11.
Figure 15:
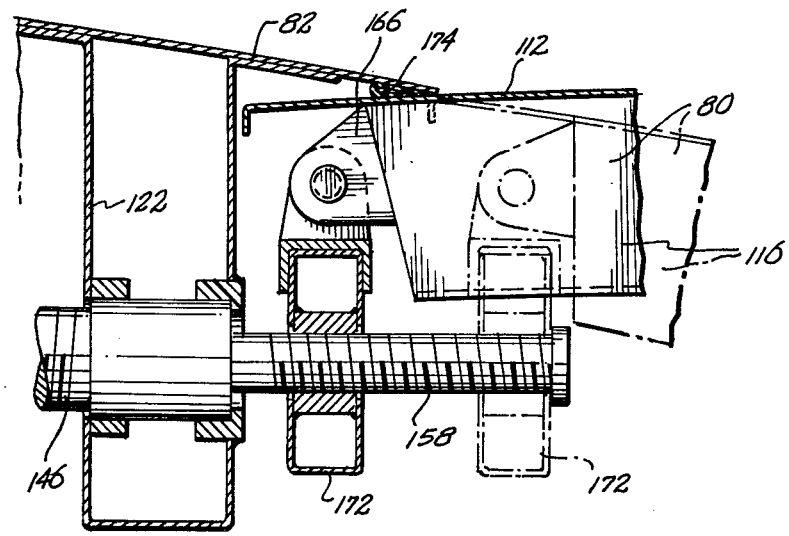
FIG. 15 is an enlarged cross-sectional view of the drive arrangement of FIG. 14 which illustrates the interface region between the variable geometry nozzle housing outer wall and the stationary portion of the gas turbine engine installation.

The gear-driven drive units 144 that control the displacement of the support beams 116 of the nozzle housing 14 are illustrated in FIGS. 14 and 15. As depicted in FIG. 14, the drive units 144 are mounted to the spaced apart annular channels 122 and include a shaft 146 that extends axially through the channels 122, with the shaft being mounted for a rotation in the channels 122. Each shaft 146 is driven by a system of spur gears 148 that is mounted in the interior region of the forwardmost channel 122 with each of the gear systems 148 being driven by bevel gears 150 that are mounted to a series of shafts 152 which extend circumferentially about the outer periphery of the exhaust nozzle 114. The shafts 152 are driven by one or more conventional actuators (not shown) to operate each of the drive units 144 in unison.

The shaft 146 of each drive unit 144 includes a forward threaded region 154 on that portion of the shaft 146 which projects forwardly of the forwardmost channel 122, a central threaded region 156 located between the two channels 122 and an aft threaded region 158 on that portion of the shaft 146 which projects rearwardly from the aftmost channel 122. A threaded collar or nut 160 is engaged with the central threaded region 156 with the collar 160 being pivotally attached to one end of an elongate expander arm 162. The expander arm 162 extends rearwardly and downwardly to a juncture between two hinged together support beams 116 that respectively extend along an overlap region between two adjacent upstream petals 96 and two downstream petals 90. The support beams 116 are hinged together and pivotally attached to the expander arm 162 by a pin 164 which passes through suitably sized openings in flanges 166 that extend from the support beams 164 and a suitably sized opening in the terminus of the expander arm 162. A secondary expander arm 168, which is pivotably attached to the central region of the pivot arm 162, extends to a pivotable connection 169 formed at the forward face of the rearmost channel 122.

The forward end of each support beam 116 that is associated with the petals 96 is pivotally attached to a second collar 170 which is engaged with the forwardmost threaded portion 154 of the shaft 146. In a similar fashion, the forward end of each support beam 116 that is associated with the petals 80 is pivotally attached to a third collar 172 which is engaged with the rearmost threaded portion 158 of the shaft 146.

As is illustrated by the phantom lines of FIG. 14, as the shaft 146 is rotated, the expander arms 162 and 168 cause the juncture between the support beams 116 that are associated with the petals 90 and 96 to move inwardly and outwardly along a plane that is coincident with the nozzle throat region 70. Further, as the shaft 146 is rotated, the aftmost collar 172 travels along the rearmost region 158 to axially displace the forward end of each support beam 116 that is associated with the petals 80. As is indicated in FIG. 14, and as can be seen most clearly in FIG. 16, the fore and aft displacement of the aftmost collar 172 and the radial displacement of the juncture between the support beams 116 establish the effective throat diameter of the nozzle and the effective diameter of the exhaust nozzle exit opening 88. In particular, the forward threaded region 154 and the central threaded region 156 are of opposite pitch than that of the aft threaded region 158. Thus, as the shaft 146 is rotated, the collars 160 and 170 travel in a direction opposite to that traveled by the threaded collar 172. For example, when the exhaust nozzle housing 14 is being actuated from the subsonic mode of operation depicted in FIG. 1 to either the supersonic or the thrust reversal mode of operation depicted in FIG. 16, the collars 160 and 170 travel rearwardly to decrease the nozzle throat area while the collar 172 travels in the forward direction to increase the area of the nozzle exit opening 88. Preferably, and as is illustrated in FIG. 15, the petals 80 and the associated support beams 116 are arranged such that the outer surface of the exhaust nozzle is substantially continuous for each operating mode. In this respect, the outer boundary surface 82 of the engine housing or nacelle preferably extends rearwardly over the forward termination of the surface sheets 112 and support beams 116 of the petals 80. A small tubular seal 174, constructed of pliant material, is positioned between the aft terminus of the boundary wall 82 and the circumferentially extending, overlapping surface sheets of the petals 80. As the collar 172 travels fore and aft along the threaded region 158 of the shaft 146, the seal 174 remains compressed between the outer surface of the surface sheets 112 and the inner surface of the boundary wall 82 to thereby provide pressure containment.

Since, as previously described, the support beams 116 are circumferentially interspersed with the beams 114 of the petals 80, 90 and 96, it can be recognized that the hydraulically operated drive units 110 and gear driven drive units 144 are circumferentially interspersed with one another about the periphery of the nozzle housing 14. This relationship is most clearly illustrated in FIG. 9, which also depicts the operating relationship between the hydraulically operated drive units 110 and gear driven drive units 144. More specifically, although in accordance with this invention the hydraulically operated drive units 110 and gear driven drive units 144 are operated in unison with one another, the relatively low inertia exhibited by the hydraulically operated drive units 110 and associated petals 90 and 96 permit relatively rapid changes in the geometry of the nozzle housing 14 while the higher inertia and hence lower operating speed exhibited by drive units 144 and associated support beams 116 move the support beams 116 into abutment with the overlapping petal region during periods of operation in which increased pressure containment is necessary. In addition, when substantial changes in the geometry of the nozzle housing 14 are required such changes are not effected in a relatively short time period and the hydraulically operated drive units 110 and gear driven drive units 144 operate at a rate which maintain the support beams 116 in abutment with the overlapping regions of the petals 80, 90 and 96. For example, when an aircraft employing the exhaust nozzle of this invention accelerates through the subsonic flight region and into a supersonic mode of operation, the required changes in exhaust nozzle geometry are effectively continuous, at a relatively low rate. Under such circumstances, the hydraulically operated drive units 110 and the gear driven drive units 146 operate at substantially the same rate to maintain the support beams 116 in juxtaposition with the area of overlap between adjacent ones of the petals 80, 90 and 96. On the other hand, when the aircraft is operating in the transonic and supersonic flight modes, rapid changes in nozzle pressure ratio can occur. As previously mentioned, unless rapid and precise variation is effected in the geometry of the exhaust nozzle, overall engine installation operating efficiency is decreased and, if the pressure disturbances are severe enough, the gas turbine engine can be structurally damaged. In accordance with the invention, the rapid decrease in nozzle throat area necessitated by such changes in nozzle pressure ratio are effected by the hydraulically operated drive units 110.

Figure 9:
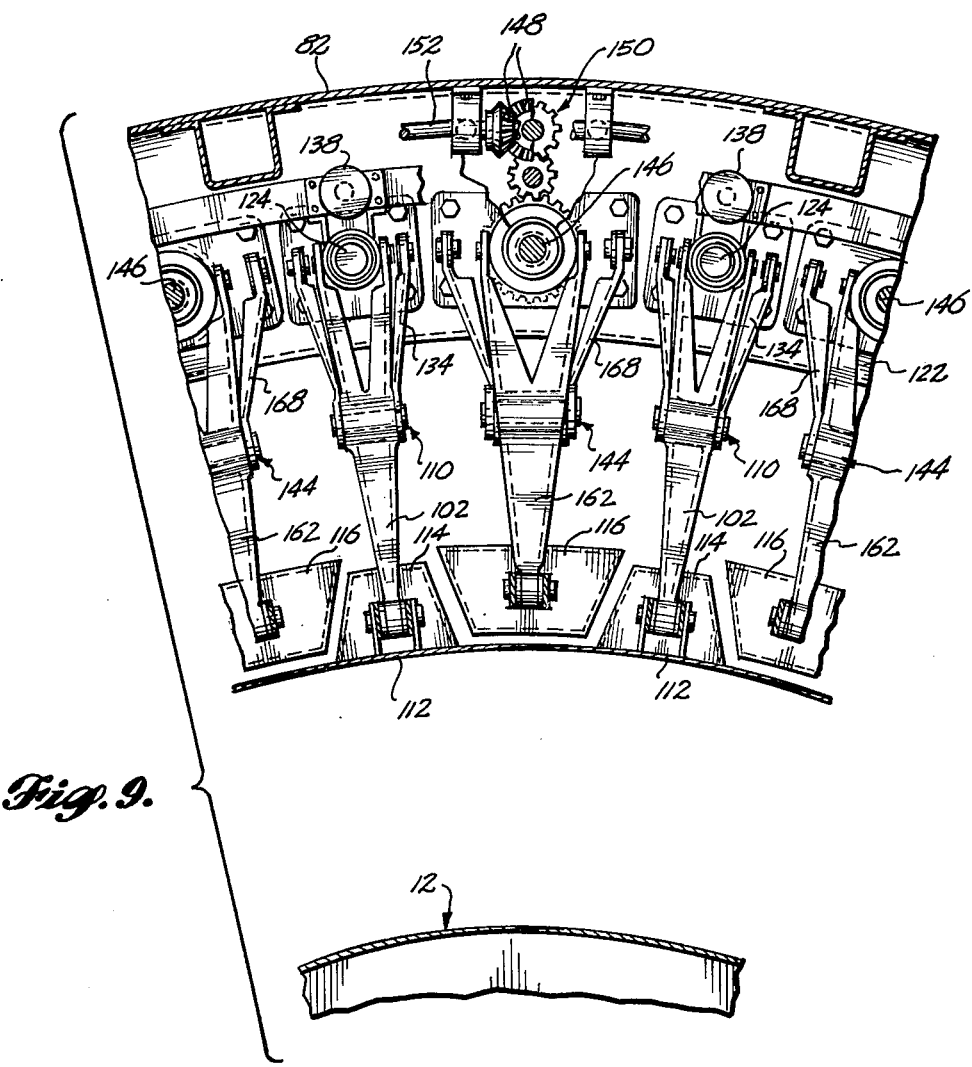
FIG. 9 is a partial cross-sectional view taken transverse to the axial center line of the exhaust nozzle of FIG. 1 which illustrates two types of drive units that are used to control the geometry of the nozzle housing.

As is illustrated in FIG. 9, when such rapid changes in configuration are required, the hydraulically operated drive units 110 move the associated petals 90 and 96 at a faster rate than the gear driven drive units 144 move the support beams 116. Thus, the overlapping surface sheets 112 of the petals 90 and 96 essentially move away from the support beams 116. If the nozzle pressure ratio remains substantially constant following such an abrupt change, the support beams 116 will, under the direction of the gear driven drive units 144, move into abutment with the overlap regions of the petals 90 and 96. If, on the other hand, the nozzle pressure ratio fluctuates or returns to the original value, the hydraulically operated drive units 110 respectively modulate the nozzle throat area or move the petals 90 and 96 back to their original position such that the support beams 116 again abut the overlap region between adjacent ones of the petals 90 and 96.

It should be recognized that, during such rapid variations in nozzle throat area, substantial pressure differences do not exist between the fluid passage defined with the exhaust nozzle and the interior region of the nozzle housing 14, i.e., the generally annular region defined between the petals 90 and 96 and the outer surface of the exhaust nozzle which is defined by the petals 80 and the boundary wall 82. Thus, adequate pressure containment is provided by the exhaust nozzle 14 during the relatively short periods of time in which the petals 90 and 96 are not fully supported by the support beams 116. Further, since in most embodiments of the invention the nozzle housing 14 is not configured at the maximum throat area position when such rapid changes in nozzle throat area are effected, circumferentially adjacent petals 90 and circumferentially adjacent petals 96 overlap one another by a substantial amount and hence exhibit a relatively high degree of resistance to distortion or deformation that could be caused by such a pressure differential.

Figure 10:
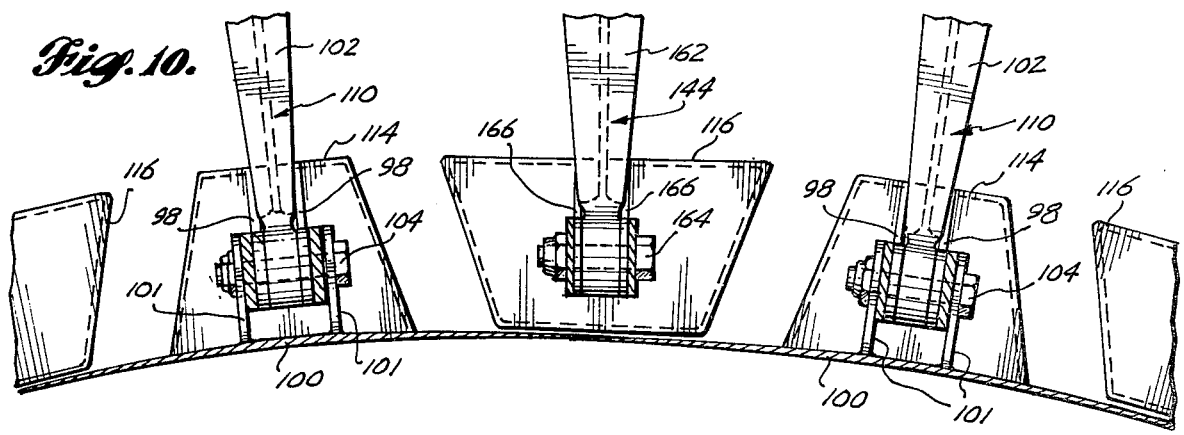
FIGS. 10 and 11 are partial cross-sectional views which further depict the nozzle housing drive assemblies and the inner boundary wall of the nozzle housing with FIG. 10 depicting the nozzle housing in the subsonic position and FIG. 11 depicting the nozzle housing in the supersonic position.
Figure 11:
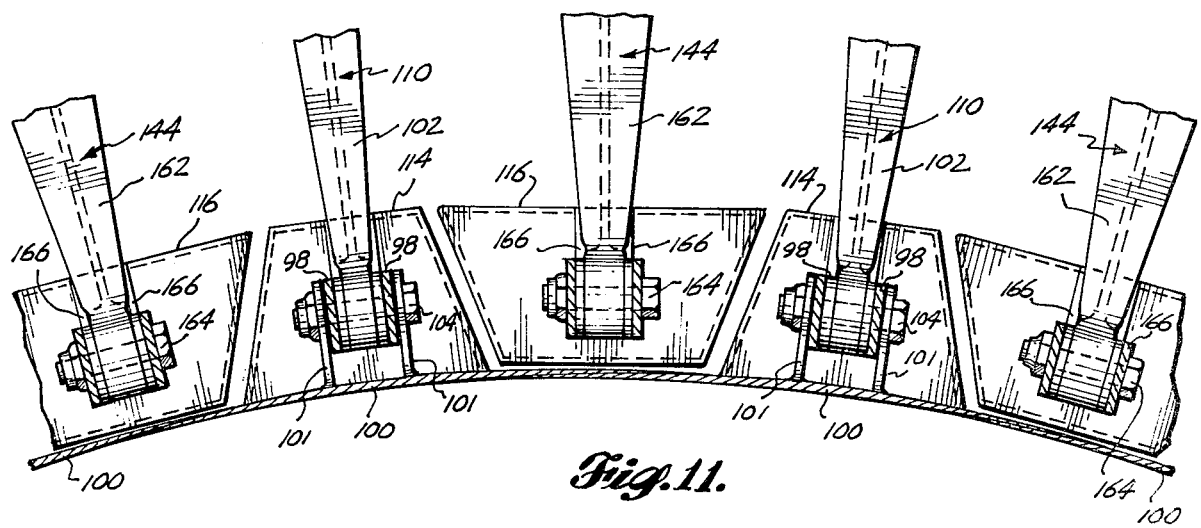

Both the extent of overlap between adjacent petals 96 and adjacent petals 90 and the structure of the juncture between associated petals 90 and 96 are illustrated in FIGS. 10 through 13. In this respect, FIGS. 10 and 11 respectively depict the orientation of the petal beams 114, the support beams 116, and the ring elements 100 when the nozzle housing 14 is at or near the position of maximum nozzle throat area (subsonic mode of operation) and when the nozzle housing 14 is at or near the position of minimum nozzle throat area (supersonic and thrust reversal modes of operation). As is illustrated in both FIGS. 10 and 11, the ring elements 100 are similar in construction to the ring elements 59 which were previously described relative to the variable geometry plug 12. In particular, each ring element 100 is arcuate in cross-sectional geometry and includes two spaced apart tabular extensions 101 that extend upwardly to nest with the flanges 98 of the petals 90 and 96. A conventional pin or bolt 104 passes through suitably sized openings in the flanges 98 and the tabular extensions 101 of the ring elements 100 to pivotably join the petals 90 and 96 and the ring elements 100 to the expander arms 102 of the hydraulically operated drive units 110. The arcuate portion of each ring element 100 smoothly decreases in thickness between the central flanged region thereof to each of the boundary edges such that circumferentially spaced apart ring elements 100 of the nozzle housing 14 overlap one another to effectively define a continuous ring in each operative position of the exhaust nozzle housing 14. Thus, as is illustrated in FIG. 10, when the nozzle housing 14 is positioned to effect maximum nozzle throat area (subsonic operating mode of FIG. 1), minimal overlap is present between circumferentially spaced apart ring elements 100. On the other hand, when the exhaust nozzle 14 is positioned at or near the geometry in which minimum nozzle throat area is effected (e.g., the supersonic and thrust reversal modes of operation depicted in FIGS. 16 and 17), substantial overlap between adjacent ring elements 100 occurs. Since the arcuate dimension of the ring elements 100 preferably corresponds to the arcuate dimension of the petald 90 and 96 at the throat region 70, similiar amounts of petal overlap are present.

Figure 12:
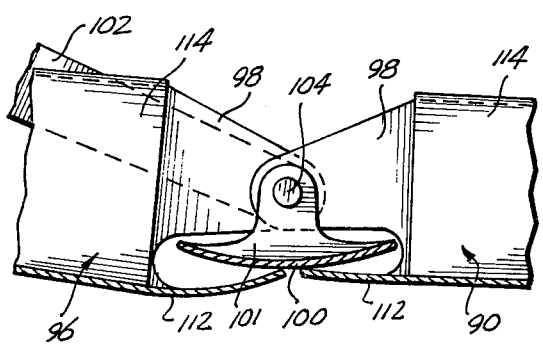
FIGS. 12 and 13 are partial cross-sectional views taken along the axial direction which respectively illustrate the throat region of the exhaust nozzle housing in the subsonic and supersonic operating modes.
Figure 13:
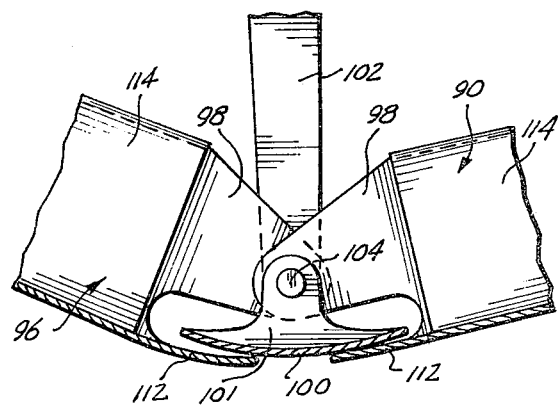

As shown in FIGS. 12 and 13, the ring elements 100 are also arcuately contoured in the axial direction. In particular, the surface sheets 112 of each petal 90 and 96 extend outwardly over the surface of the ring elements 100 with the outwardly extending portions of the surface sheets 112 being formed or contoured to remain in continuous contact with the arcuate surface of the ring elements 100 as the geometry of the exhaust nozzle housing 14 is varied. As is shown in FIG. 12, when the exhaust nozzle housing 14 is operated to the subsonic position of FIG. 1, the terminating edges of each surface sheet 112 contact the central region of the ring elements 100. On the other hand, when the exhaust nozzle housing 14 is operated to the supersonic or thrust reversal mode of FIG. 16, the arcuate extensions of the surface sheets 112 contact the arcuate surface of the ring elements 100. Thus, regardless of the position of the petals 90 and 96, the ring elements 100 and the surface sheets 112 cooperate with one another to maintain a substantially continuous flow boundary.

It should be noted that during the time periods which the hydraulically operated drive units 110 provide rapid adjustment of the nozzle throat area, the diameter of the nozzle exit opening 88 generally remains constant. In particular and referring again to FIGS. 1 and 14, the forward end of the petals 80 are not positioned by the hydraulically operated drive units 110 but are positioned by the collar 172 of the gear driven drive units 144. Thus, as previously described, the diameter and hence the area of the nozzle exit opening 88 is established by the relative positions of the collars 160, 170 and 172 of the gear driven drive units 144, which collars in turn control the position of the forward end of the petals 80 and the radial displacement of the support beams 116 which are interspersed with the beam members 114 of the petals 90 and 96. As shown in FIG. 1, the aft end of the petals 90 are not rigidly affixed to the aft end of the petals 80, but are linked thereto by the previously described pins 92 which pass outwardly into the axial slots 94 of the petals 80. Thus, when the hydraulically operated drive units 110 effect a relatively rapid decrease in the nozzle throat area by moving the juncture between the petals 90 and 96 radially inward, the collar 126 which supports the forward end of the petals 96 slides axially rearward along the shaft 124 and the pins 92 at the aft end of each petal 90 slide axially forward in the slots 94. Thus, the rapid operation of the hydraulically operated drive units 110 provide the desired adjustment of the nozzle throat area without changing the nozzle exit area 88. It is to be further recognized, however, that since the hydraulically driven drive units 110 and gear driven drive units 144 are operated in unison with one another, the area of the nozzle exit openings will be changing at a relatively slow rate under the control of the gear driven drive units 144. Thus, should a nozzle pressure ratio change that precipitated the rapid adjustment of the nozzle throat area persist, the gear driven units 144 will continue to operate until the beam members 116 again contact the overlap regions of the circumferentially extending petals 90 and 96 to thereby provide the desired support and the nozzle exit area which is appropriate to the new geometry of the nozzle housing 14. On the other hand, if the change in engine pressure ratio which precipitates the rapid throat area adjustment is transitory, the hydraulically operated drive units 110 will return the petals 90 and 96 to the original position and the exhaust nozzle housing 14 will be configued as it was prior to such a pressure disturbance.

In view of the above described structure of the variable geometry plug 12 and the variable geometry nozzle housing 14, it can be seen that operation of the invention can be effected by an automatic control system or by manual control which enables simultaneous operation of the tail plug threaded nut assembly 56 and the drive units 110 and 144 of the nozzle housing 14. As indicated herein, such an automatic or manual control system controls the geometry of the plug 12 and the nozzle housing 14 such that the overall nozzle configuration is divergent in nature when the aircraft is operated in the subsonic mode (FIG. 1) and such that the overall nozzle configuration includes a convergent upstream portion and divergent downstream portion when the aircraft is operated in the supersonic mode (FIG. 16). Further, as described above, the hydraulically operated drive mechanisms 110 provide rapid and precise adjustment of the nozzle throat region 70 during transonic and supersonic operation with the gear driven drive units 144 effectively following the hydraulically operated drive units 110 at a slower rate to provide further reconfiguration of the nozzle geometry should the changes in nozzle pressure ratio persist.

As depicted in FIGS. 16 and 17, the variable geometry nozzle of this invention can be configured for operation with conventional thrust reversers. For example, FIG. 16 illustrates an embodiment of this invention configured for operation with the type of thrust reverser which requires blocking or closing off the engine installation fan duct when the thrust reversers are activated. One example of such a thrust reverser system is disclosed in U.S. Pat. No. 4,026,105 issued on May 31, 1977 to Varnell James and assigned to the assignee of this invention. In this thrust reverser system, cascade elements located aft of the engine fan stage are opened and closed by rotation through an arc of approximately 90°. When the cascade elements are opened to provide thrust reversal, blocking doors move rearwardly and inwardly to close off the aft portion of the engine fan duct thereby causing the fan flow to exit through the cascade elements in a direction opposite that of the forward thrust producing fluid stream.

In engine installation utilizing the exhaust nozzle of this invention, such blocking doors can be eliminated and operation of the cascade thrust reverser elements disclosed in U.S. Pat. No. 4,026,105 or various other cascade thrust reversers that are known in the art, can be operated in conjunction with the variable geometry nozzle to provide the desired thrust reversal. In particular, as illustrated in FIG. 16, the hydraulically operated drive unit 110 and the petals 90 and 96 can be dimensioned such that the juncture between the petals 90 and 96, i.e., the exhaust nozzle throat 70, is in abutment with the inner boundary wall 22 of the fan duct 108 when the exhaust nozzle housing 14 is operated to the minimum throat area configuration. To provide adequate pressure containment, the gear driven drive units 144 and support beams 116 that are circumferentially interspersed with the beam members 114 of the petals 90 and 96 are dimensioned and arranged to place the inner surface of the support members 116 in abutment with the overlap regions between adjacent ones of the petals 90 and 96 when the nozzle housing 14 is operated to the thrust reversal position.

FIG. 17 depicts an exhaust nozzle in accordance with this invention that is configured for thrust reversal operation in an engine installation wherein a single flow duct is necessarily closed off during thrust reverser operation. Such single flow duct configuration exists, for example, in turbofan engines that employ mixing of the fan stream and primary fluid stream upstream of the exhaust nozzle entrance opening or in turbojet engines which do not utilize a secondary fluid stream. In any case, the exhaust nozzle of this invention can accommodate thrust reversal in such an engine installation by configuring the variable geometry plug 12 and the nozzle housing 14 such that the throat regions of the nozzle housing 14 and the plug 12 come into abutment with one another when the plug 12 is in its maximum diameter position and the exhaust nozzle 14 is in the minimum nozzle throat position. As illustrated in FIG. 17, such an embodiment of the invention is structured in substantially the same manner as was described relative to the embodiment depicted in FIG. 1 with the plug petals 24 and 26, the nozzle housing petals 90 and 96, and the associated drive units 36, 110 and 144 being dimensioned to permit radial displacement of the plug 12 nozzle housing 114 which effects closure of the flow duct 176. Additionally, in such an embodiment of the invention, it may be necessary and desirable to slidably mount the ring 28, which provides the pivotable connection to the forward end of the plug petals 24 to the shell 30, rather than mounting the ring 28 in a fixed orientation.

It should be recognized that the embodiments of the invention disclosed herein are exemplary in nature and that many variations therein can be practiced without departing from the scope and spirit of this invention.

For example, although the invention has been described relative to a variable geometry exhaust nozzle including a variable geometry plug assembly 12 and a variable geometry nozzle housing 14, in some situations the described plug assembly 12 or nozzle housing assembly 14 can be respectively utilized with a fixed geometry housing and a fixed geometry plug. In this respect, since the variable geometry nozzle housing 14 is configured to provide excellent pressure containment while being specifically adapted for effecting rapid adjustment in nozzle throat area, it is contemplated that the nozzle housing 12 be advantageously employed with a number of conventional fixed or variable geometry plug configurations. Further, it can be recognized that many variations in the specific structure of the drive units 36, 110 and 144 are possible. For example, in some situations the required operational forces and structural integrity can be achieved without the use of the pivot arms 72, 134 and/or 168.

The embodiments of the invention in which an exclusive property or privilege is claimed are defined as follows:

1. An exhaust nozzle for containing and directing the flow of exhaust gases generated by a gas turbine engine, said exhaust nozzle comprising:

a nozzle housing mountable to the aft end of said gas turbine engine to extend rearwardly therefrom, said nozzle housing including a first and second set of axially extending elements for defining a flow passage through said nozzle housing, each of said elements being of arcuate cross-sectional geometry, said first set of elements being arranged in circumferential orientation with the outward regions of said arcuate cross-sectional geometry of adjacent ones of said first set of elements overlapping one another to define an upstream portion of said flow passage, said second set of elements being arranged in circumferential orientation to define a downstream portion of said flow passage with the outward regions of said arcuate cross-sectional geometry of adjacent ones of said second set of elements overlapping one another, the downstream end of each of said elements of said second set of elements being configured and arranged to define an exit opening of said exhaust nozzle, the downstream end of each element of said first set of elements being pivotably interconnected with the upstream end of an associated element of said second set of elements;

a first and second plurality of elongate support beams, a first end of each of said support beams of said first plurality of support beams being pivotably interconnected with a first end of an associated one of said support beams of said second plurality of support beams, to form a pair of hinged together support beams, each pair of hinged together support beams being positioned and mounted to extend along one of said overlap regions formed between adjacent elements which define said flow passage, the juncture between said support beams being positioned contiguously with the juncture between associated elements of said first and second set of axially extending elements, the second end of each of support beams of said second plurality of support beams being linked to said second plurality of elements at a position near said exit opening;

first drive means for simultaneous radial displacement of each pivotable juncture between associated elements of said first and second set of elements to define a controllable area throat region within said throat passage; and second drive means for simultaneous radial displacement of the pivotable junctures between said first and second support beams.

2. The exhaust nozzle of claim 1 further comprising an axially extending tail plug mounted to the central region of said gas turbine engine, said tail plug extending rearwardly from said gas turbine engine in concentric relationship within said flow passage of said exhaust nozzle housing.

3. The exhaust nozzle of claim 2 wherein said tail plug is of variable geometry, said tail plug including a third and fourth set of axially extending elements having an arcuate cross-sectional geometry, said third set of elements being arranged in circumferential orientation about the axial centerline of said tail plug to form an upstream region of the surface of said tail plug with outward regions of said arcuate cross-sectional geometry of adjacent ones of said elements of said third set of elements overlapping one another, the upstream end of each of said elements of said third set of elements being pivotably attached to said central region of said gas turbine engine, said fourth set of elements being arranged in circumferential orientation about the axial centerline of said tail plug to form a downstream region of the surface of said tail plug with the outward regions of said arcuate cross-sectional geometry of adjacent ones of said elements of said fourth set of elements overlapping one another, the upstream end of each of said elements of said fourth plurality of elements being pivotably attached to the downstream end of an associated element of said third set of elements, said pivotable attachment between said third and fourth set of elements being positioned in a transverse plane of said exhaust nozzle which is substantially coincident with said pivotable interconnections between said first and second set of elements of said nozzle housing, the downstream end of each of said elements of said fourth set of elements being pivotably attached to the downstream termination of said tail plug, said exhaust nozzle further comprising third drive means for simultaneous radial displacement of said pivotable attachments between said third and fourth set of elements to control the maximum diameter of said tail plug.

4. An exhaust nozzle for a gas turbine engine installation wherein a gas turbine engine is contained within a generally annular housing and the aft terminus of said gas turbine engine includes an annular outlet opening for the exiting of a propulsive fluid stream from said gas turbine engine, said variable geometry exhaust nozzle comprising:

an exhaust nozzle housing of generally annular cross-sectional geometry, said exhaust nozzle housing mountable to said gas turbine engine housing to extend axially rearward therefrom, the outer surface of said nozzle housing substantially defining a continuation of the outer surface of said engine housing, the interior surface of said annular nozzle housing defining a flow passage for receiving said propulsive fluid stream of said gas turbine engine and directing said fluid stream into the atmosphere, said exhaust nozzle housing including a first set of petals for defining said outer surface of said nozzle housing and a second and third set of petals for defining said interior surface of said nozzle housing, each of said petals of said first, second and third set of petals being of arcuate cross-sectional geometry for defining an axially extending portion of said nozzle outer and interior surfaces of said nozzle housing, each of said petals including an elongate beam member extending axially along the central region thereof, the first end of each beam member of said second set of petals being pivotably attached to the first end of the beam member of an associated petal within said third set of petals, each petal of said second and third set of petals extending axially to respectively define upstream and downstream segments of said nozzle housing flow passage with the outward regions of adjacent ones of said petals of said second and third set of petals overlapping one another, the second end of each of said beam members of said third set of petals being linked to the first end of the beam member of an assocated petal of said first set of petals to define an exit opening, each petal of said first set of petals extending axially to define a segment of said outer surface of said nozzle housing with the outward regions of adjacent ones of said petals of said first set of petals overlapping one another, said nozzle housing further including first, second and third sets of elongate support beams, the support beams of said first set of support beams being circumferentially interspersed with said beam members of said first set of petals and extending axially along the overlapping regions of adjacent petals of said first set of petals, the first and second ends of each support beam of said first set of support beams being respectively linked to the adjoining first and second ends of said beam members of said first set of petals, the first end of each support beam of said second set of support beams being pivotally attached to the first end of an associated support beam of said third set of support beams, each support beam of said second set of support beams and the associated support beam of said third set of support beams being circumferentially interspersed between adjacent ones of the pivotally attached beam members of said second and third set of petals and extending axially along the overlapping regions of adjacent petals of said second and third set of petals with each pivotable attachment between said second and third support beams being substantially located in a plane that is transverse to said flow passage and which includes each of said pivotable attachments between the first ends of the beam members of said second and third set of petals;

first actuation means interconnected with the second end of each of said beams of said second set of petals and interconnected with each pivotable attachment between said first ends of said beams of said second and third set of petals, said first actuator means including means for axially positioning said second ends of said beams of said second set of petals and means for simultaneously radially positioning said pivotable attachments between said first ends of said beams of said second and third sets of petals to define a controlled area throat region within said flow passage, said throat region being in a plane substantially coincident with said transverse plane which includes said pivotable attachments between said beam members of said second and third set of petals and said pivotable attachments between said support beams of said second and third set of support beams; and second actuator means interconnected with the second end of each of said support beams of said first set of support beams and interconnected with each pivotable attachment between said first ends of said support beams of said second and third set of support beams, said second actuator means including means for axially positioning said second ends of said second set of support beams and means for simultaneously radially positioning said pivotable attachments between said support beams of said second and third sets of support beams, said second actuator means having a maximum rate of operation that is less than the maximum rate of operation of said first actuator means, said second actuator means being simultaneously operable with said second first actuator means to maintain said second and third sets of support beams in substantial contact with said overlapping regions between adjacent petals of said second and third set of petals when said first actuator means is operated at a rate which does not exceed said maximum rate of operation of said second actuator means, said second actuator means being further operable to bring said second and third sets of support beams into substantial contact with said overlapping regions between said second and third set of petals whenever said first actuator means is operated at a rate that exceeds said maximum rate of operation of said second actuator means.

5. The exhaust nozzle of claim 4 further comprising an axially extending tail plug mounted to extend axially rearward from said gas turbine engine, said tail plug being coaxially contained within said flow passage to impart a generally annular cross-sectional geometry to said flow passage and said throat region.

6. The exhaust nozzle of claim 5 wherein said tail plug is of variable geometry, said tail plug including a fourth and fifth set of petals for respectively defining upstream and downstream portions of the surface of said tail plug, each of said petals of said fourth and fifth set of petals being of arcuate cross-sectional geometry with both said fourth and fifth set of petals being collectively arranged to form a substantially continuous surface with outward regions of adjacent petals of said fourth and fifth set of petals overlapping one another, each of said petals of said fourth and fifth set of petals including an elongate beam member extending axially along the central region thereof, the first end of each beam member of said fourth set of petals being pivotably attached to the first end of the beam member of an associated petal within said fifth set of petals, said pivotable connections between said fourth and fifth set of petals being located in said plane transverse to said flow passage that includes said pivotable attachments between said nozzle housing second and third set of petals and said pivotable attachments between said nozzle housing second and third set of support beams, said tail plug further including first and second annular mounting rings, said first mounting ring being located upstream of said pivotable attachments between said fourth and fifth sets of petals, the second end of each beam member of said fourth set of petals being pivotably attached to said first annular mounting ring, said second annular mounting ring being located downstream of said pivotable attachments between said fourth and fifth sets of petals at a position near the downstream terminus of said tail plug, the second end of each of said beam members of said fifth set of petals being pivotably attached to said second annular mounting ring;

said exhaust nozzle further comprising third actuator means for radially positioning said pivotable attachments between said beam members of said fourth and fifth set of petals to control the maximum diameter of said tail plug for increasing and decreasing the area of said annular throat region, said third actuator means bein operable independently of the operation of said first and second actuator means.

7. The exhaust nozzle of claim 6 wherein the first end of each of said petals of said first set of petals includes a pair of spaced apart flanges extending inwardly toward said tail plug, each of said flanges including an axially extending slot, and wherein said second end of each of said beam members of said third set of beam members includes a pin passing outwardly from said beam member and through the slots of said associated petal of said first set of petals to link said second end of each of said beam members of said third set of beam members to said associated petal of said first set of petals, each of said pins being slideable along said slots during periods of operation in which said first actuator means is operated at a rate which exceeds said maximum operational rate of said second actuator means to provide variations in the area of said throat region without substantial variation in the area of said exit opening.

8. The exhaust nozzle of claim 6 wherein said first actuator means comprises:

first and second spaced apart annular channels mounted within the region defined between said exhaust nozzle outer and inner surfaces;

a plurality of shafts, each of said shafts mounted to said first annular channel and passing through said second annular channel to extend forwardly therefrom, each of said shafts being in substantial alignment with the beam members of associated petals of said second and third set of petals;

a plurality of first collars, each of said first collars being slideably mounted to that portion of an associated one of said shafts that extends forwardly from said second annular channel, each of said first collars being pivotably connected to the first end of said beam member of said second set of petals that is in alignment with the shaft upon which said first collar is slideably mounted;

a plurality of second collars, each of said second collars being slideably mounted to that portion of an associated one of said shafts that extends between said first and second annular channels;

a plurality of elongate expander links, one end of each of said second expander links being pivotably interconnected with an associated one of said second collars with the second end of each expander link being pivotably interconnected with the pivotable attachment between those associated petals of said second and third set of petals that are in substantial alignment with the shaft upon which said second collar is slideably mounted; and, a plurality of hydraulic cylinders, each of said hydraulic cylinders being mounted in axial alignment with an associated one of said shafts, each of said hydraulic cylinders including an actuator rod extending rearwardly therefrom, said actuator rods moving inwardly and outwardly from said hydraulic cylinders as the fluid pressure within said hydraulic cylinders is varied, the end of each of said actuator rods being pivotably interconnected with that second collar that is slideably mounted to the shaft that is associated with said hydraulic cylinder to provide axial positioning of said second ends of said beam members of said second set of petals and simultaneous radial positioning of said pivotable attachments between said first ends of said second and third set of petals.

9. The exhaust nozzle of claim 8 wherein said second actuator means comprises:

a plurality of shafts, each of said shafts mounted for rotation in said first and second annular channels with each of said shafts extending rearwardly from said first annular channel for a predetermined distance and extending forwardly from said first annular channel for a predetermined distance, each of said shafts being in substantial alignment with an associated pivotably attached support beam of said second and third set of support beams, each of said shafts including a first threaded region on that portion of said shaft extending forwardly of said second annular channel, a second threaded region on that portion of said shaft located between said first and second annular channels, and a third threaded region on that portion of said shaft extending rearwardly of said first annular channel, said first and second threaded regions being of opposite pitch than said third threaded region;

a plurality of first threaded collars, each of said first threaded collars being engaged with said first threaded region of an associated one of said shafts, each of said first threaded collars being pivotably connected to the second end of said support beam of said second set of support beams that is in alignment with the shaft with which said first thread collar is engaged;

a plurality of second threaded collars, each of said second threaded collars being engaged with said second threaded region of an associated one of said shafts;

a plurality of elongate expander arms, one end of each of said expander arms being pivotably interconnected with an associated one of said second threaded collars with the second end of each expander arm being pivotably interconnected with the pivotable attachment between those associated support beams of said second and third sets of support beams that are in alignment with said shaft with which said second threaded collar is engaged;

a plurality of third threaded collars, each of said third threaded collars being engaged with said third threaded region of said third threaded region of an associated one of said shafts, each of said third threaded collars being pivotably connected to the second end of a support beam said first set of support beams that is in alignment with the shaft with which said third thread collar is engaged; and drive means for simultaneously rotating each of said second actuator shafts to move said first, second and third threaded collars along said threaded shafts for axially positioning both the second ends of said second set of support beams and the second ends of said first set of support beams while simultaneously radially positioning said pivotable attachments between said support beams of said second and third set of support beams.

10. The exhaust nozzle of claim 9 wherein said third actuator means comprises:

a cylindrical tube extending coaxially rearward through the interior region of said tail plug, said cylindrical tube including a plurality of circumferentially spaced apart slots that extend axially along a predetermined portion of said cylindrical tube;

a shaft coaxially mounted for rotation within said cylindrical tube, said shaft including an axially extending threaded region;

a threaded nut assembly engaged with said axially extending threaded region, said threaded nut assembly having a plurality of arms, each of said arms extending radially to one of said slots in said cylindrical tube;

a plurality of elongate links, one end of each of said links being pivotably interconnected with one of said arms of said threaded nut assembly through one of said slots, the other end of each of said links being pivotably interconnected with one of said pivotable attachments between said beam members of said fourth and fifth sets of petals; and means rotating said shaft of said third actuator means to radially positioning said pivotable attachments between said beam members of said fourth and fifth set of petals to control the maximum diameter of said tail plug.

11. The exhaust nozzle of claim 6 furthr comprising a first and second plurality of arcuate elements, each of said arcuate elements of said first plurality of arcuate elements being pivotably interconnected with one of said pivotable attachment between said first ends of said beam members of said second and third set of petals, each of said arcuate elements of said second plurality of arcuate elements being pivotably interconnected with one of said pivotable attachment between said first ends of said beam members of said fourth and fifth set of beam members, adjacent ones of said first and second plurality of arcuate elements circumferentially overlapping one another to define a substantially continuous flow boundary between said pivotably attached second and third set of petals and a substantially continuous flow boundary between said pivotably attached fourth and fifth set of petals.

12. The exhaust nozzle of claim 6 wherein said gas turbine engine includes a thrust reverser operable by closing off said flow passage to prevent said propulsive fluid stream from flowing rearwardly through said exhaust nozzle and wherein said second and third sets of petals and said fourth and fifth sets of petals are dimensioned for positioning said pivotable attachments between said second and third set of petals in contacting juxtaposition with said pivotable attachments between said fourth and fifth set of petals to close off said flow passage at said throat region.

13. The exhaust nozzle of claim 6 wherein said gas turbine is of the turbofan variety and includes a cylindrical flow duct concentrically mounted about said tail plug and extending rearwardly to at least said throat region of said exhaust nozzle to define an annular primary flow passage coaxially surrounded by an annular fan flow passage, said turbofan gas turbine engine including a thrust reverser operable by closing off said annular fan flow passage, and wherein said second and third set of petals of said exhaust nozzle are dimensioned for positioning said pivotable attachments between said second and third set of petals in contacting juxtaposition with the exterior boundary of said cylindrical flow duct to close off said annular fan flow passage at said throat region of said exhaust nozzle.

* * * * *